Aug. 8, 1933.  C. C. BUTEFISH  1,921,308
RUMBLE SEAT TOP
Filed July 27, 1931   2 Sheets-Sheet 1
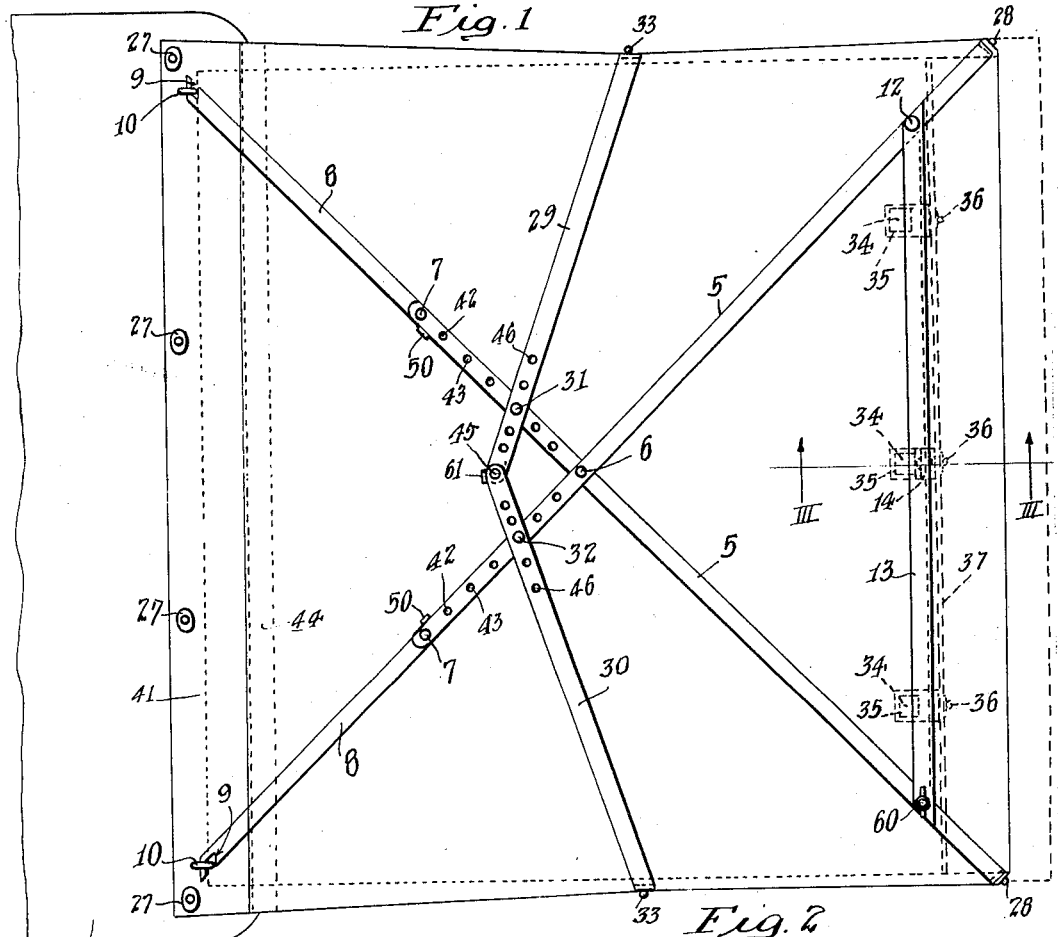
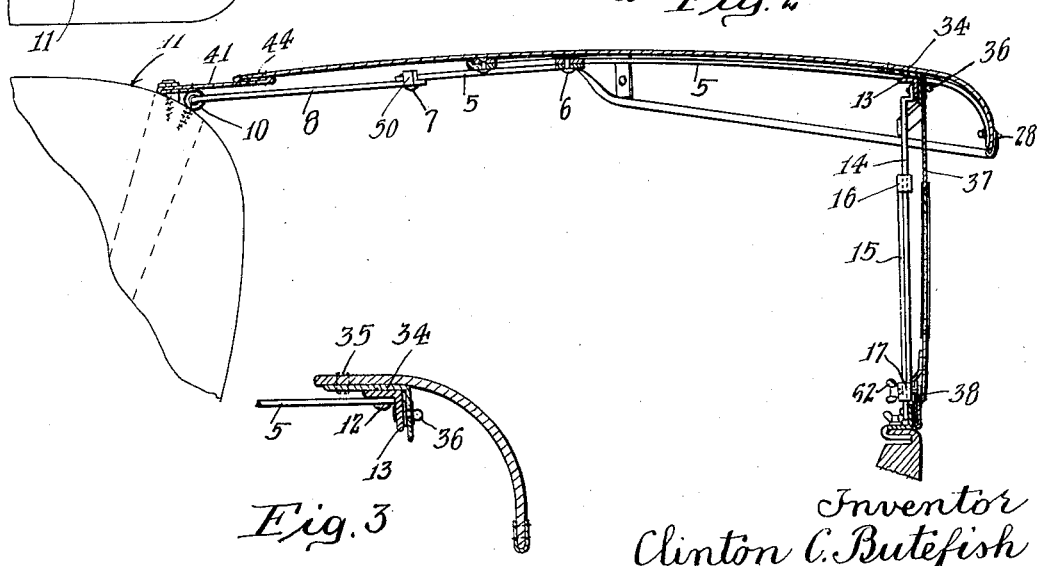
Inventor
Clinton C. Butefish
By Lyon & Lyon
Attorneys Aug. 8, 1933.   C. C. BUTEFISH   1,921,308
RUMBLE SEAT TOP
Filed July 27, 1931   2 Sheets-Sheet 2

Inventor
Clinton C. Butefish
By Lyon & Lyon
Attorneys

UNITED STATES PATENT OFFICE 1,921,308

RUMBLE SEAT TOP

Clinton C. Butefish, Los Angeles, Calif.

Application July 27, 1931. Serial No. 553,262

6 Claims. (Cl. 296—99)

This invention relates to tops for automobiles, and particularly to tops designed to shield the occupants of the rumble seat of an automobile.

An object of the invention is to provide a folding rumble seat top that can be readily attached to automobiles of standard design.

Another object is to provide a folding top that is remarkably rigid when attached to the car.

Still another object is to provide a top the length of which can be adjusted to fit cars of different dimensions.

Another object is to provide a top, the rear end of which can be raised or lowered readily to make it easier for passengers to get in and out of the rumble seat and to give them any desired amount of head room when they are seated.

Other objects and advantages of the invention will be apparent from the following detailed description when read in connection with the accompanying drawings, in which—

Figure 1 is a plan view of a top in accordance with my invention as it appears attached to an automobile, with the covering material shown translucent to disclose the frame;

Figure 2 is a side sectional view of the top showing how it is attached to the automobile;

Figure 3 is a detailed section taken in the plane III, III of Figure 1;

Figure 5:
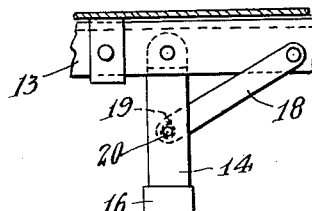
Figure 5 is an enlarged view of a portion of the top frame shown in Figure 4.

Referring to Figure 1, the main frame work of my top comprises two crossed members 5 of slat or band iron, secured together at substantially their mid points by a rivet 6. Members 5 have extensions 8 attached thereto by pins 7, the pins serving as hinges about which extensions 8 are free to swing outwardly when the top is folded. Members 8 are each provided with a lip 50 which contacts with its associated member 5, when members 8 are in extended position, to prevent inward rotation of members 8 with respect to members 5. The free ends of members 8 have slots 9 therein which are adapted to engage with screw-eyes 10 screwed into the frame-work, usually a bow, of the regular top 11 of the automobile to which my special rumble seat top is attached. The rear ends of the frame members 5 are secured by means of a rivet 12 and a bolt and wing nut 60 to the respective ends of a cross member 13. The cross member 13 preferably consists of a piece of angle iron as shown in Figure 2, and has attached thereto at substantially its mid point a downwardly extending support 14. A second support 15 extends vertically alongside of support 14 and is slidingly attached thereto by a collar 16 on member 15, and a collar 17 on the lower end of member 14, the collar attached to member 15 surrounding member 14, and the collar 17 attached to member 14 surrounding the member 15. Referring now to Figure 5, brace 18 is pivoted to the angle iron 13 a distance from the point of attachment of member 14 and has a hole 19 at its free end adapted to engage with a pin 20 secured to and projecting outwardly from member 14. The natural rigidity of brace 18 keeps it engaged with pin 20, but when desired, it can be disengaged from pin 20 by pulling it out over the end of the pin.

Figure 4:
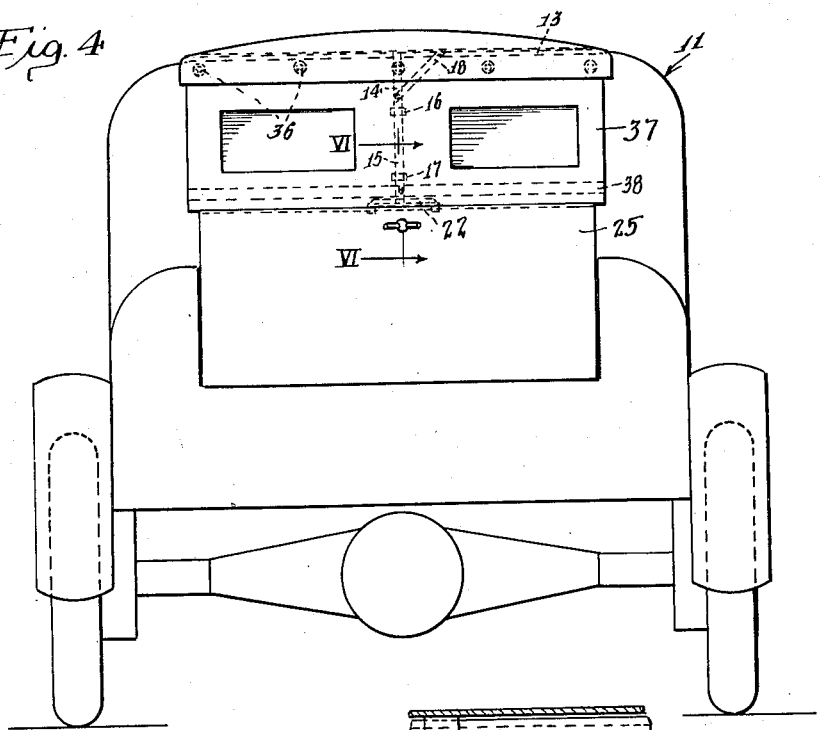
Figure 4 is a rear view of an automobile with a rumble seat top in accordance with my invention.
Figure 6:
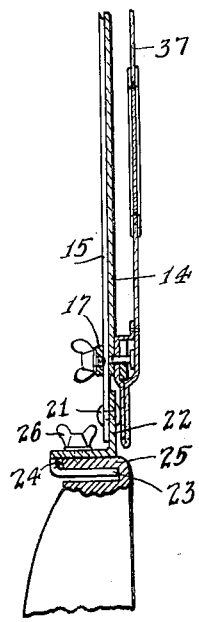
Figure 6 is a detail section taken in the plane VI, VI of Figure 4.

The lower end of supporting member 15 is secured by means of a rivet 21 (referring now to Figures 5 and 6) to a cross member 22. Cross member 22 is constructed of angle iron and has projections 23 at its ends which are bent down and under to form a channel 24 into which the lip formed in the upper edge of most rumble seats is adapted to fit. As is well known, the back of a rumble seat forms the door to the opening in which the seat is positioned and a lip 25 is ordinarily provided around the upper circumference of a turtle back lid to fit over a tongue formed in the edge of the seat opening, the latter forming a trough to conduct away rain water that may leak in around the edge of the cover. The cross member 22 is securely clamped to the top of the rumble seat by means of two studs 26 carrying wing heads, which screw through the cross member 22 and thus clamp the lip 25 on the rumble seat tightly against the extensions 23.

The covering of the top, which may be of any desired flexible material, is attached at its front end to the usual top 11 of the car by means of buttons or slip-over connections 27 and is attached at the rear to the outer ends of members 5 by similar buttons or slip-over connections 28. As shown in Figure 2, the rear ends of members 5 are bent downwardly to give a graceful curve to the rear end of the top. To support the top midway fore-and-aft, additional members 29 and 30 are provided. Members 29 and 30, like members 5, are made of flat iron strips, and are secured by rivets or cotter pins 31 and 32 to the main members 5 as shown in Figure 1, and their outer ends are provided with slip-over fasteners 33 for attachment to the cover material.

To keep the top material properly stretched it is also preferably attached by means of tabs or strips of material 34 (referring to Figure 3) to the cross member 13; thus tabs 34 may be sewed or riveted to the cover as shown at point 35, and may be provided with holes to slip over slip-over connections 36 on the downwardly extending edge of the angle iron 13.

A back curtain 37 is secured at its upper edge to the cross member 13 by attachment to the same slip-over connections 36 as are used for securing tabs 34. The lower edge of the curtain 37 is provided with a cross bar 38 which may be either fastened in a hem on the curtain 37 or secured thereto by buttons or snap connections. Bar 38 is provided with a slot 39 in its upper edge which engages with a pin 40 secured to the lower end of the vertical support 14 at a point opposite the collar 17.

Since the curtain 37 is stretched down when slot 39 is hooked under the pin 40, the natural tension of the curtain prevents the bar 38 from becoming accidentally detached from the pin 40.

When the top is to be removed, the one end of cross bar 13 is detached from the main frame member by loosening wing nut 60. The covering material may then be removed completely from frame members 5, 8, 29 and 30 by lifting the connectors 28 and 33 from the projections on the rear ends of members 5 and from the outer ends of the members 29 and 30. After cross bar 13 is detached from member 5, the forward ends of members 8 are forced inwardly far enough to remove the slots 9 in the ends thereof from the screw-eyes 10 in the regular top of the car. The top frame-work may then be removed and folded up into a flat bundle by bending members 8 and 13 back against members 5 and by bringing members 5 together about pivot 6. This simultaneously swings the outer members 29 and 30 together so that these members lie alongside of members 5. The top covering material may be removed either before or after the removal of the frame portion by lifting the buttons 27 over the projections provided on the regular top 11 of the car. The rear support comprising vertical members 14 and 15 may then be removed from the rumble seat by loosening the wing studs 26, after which cross member 22 is swung about pivot 21 until it is parallel to the supporting members 14 and 15; then by slipping brace 18 from engagement with pin 20, the members 14, 15, and 22 may be folded flat against the cross member 13 and this whole assembly can be rolled up within the top cover material.

In order that a single top may be adjusted to fit cars of different lengths, the front edge of the top cover is preferably provided with an auxiliary hem 41. Thus, referring to Figure 1, the top is attached to a car having a relatively long body, and, therefore, the main hem of the cover is secured to the permanent top 11, as shown, by means of the fasteners 27. If the car were shorter, the frame members 5 would be shortened to correspond, by removing the hinge rivets 7 which attach members 8 to members 5, and moving the rivets 7 back into one of the auxiliary holes 42 or 43 to give the proper length for the particular car. If, after members 5 have been shortened by moving their extensions 8 back with respect to the ends of members 5, the top material is found to be too loose, it may be attached at points 44 in the auxiliary hem to the projections 27 in the top 11. The surplus material extending beyond the auxiliary hem 41 may then be cut off, leaving a natural finished hem.

The width of the top at the edge of the cross members 29 and 30 may also be changed by removing the pins 31 and 32 securing members 29 and 30 to members 5, and moving members 29 and 30 forward or back until some of the other holes 46 are juxtaposed to other holes in members 5, when the pins 31 and 32 may be reinserted in the new holes to maintain members 29 and 30 in the desired position. A stop 61 is provided on hinge 45, joining bars 29 and 30 to prevent them opening beyond a predetermined angle.

A feature of particular importance in connection with my top is the way in which the vertical supporting members 14 and 15 are slidably secured to each other in a telescoping manner, since this permits the top, together with the rear curtain 37, to be lifted a distance equal to the distance between collars 16 and 17 to permit the occupants of the rumble seat to get in or out of the seat more conveniently. Furthermore, by providing a wing headed screw 62, threaded through the inner side of the lower collar 17, the collar 17 may be clamped fast to the upright member 15 at any point thereon. This makes it possible to secure the rear end of the top at any desired heighth, to give the occupants more head room if it is desired.

It should also be noted that the use of flat steel top frame members pivoted to rotate with respect to each other in a horizontal plane permits the members to be readily bent to form an arched top, as shown in Figure 2. Such a top is more ornamental than a flat top, and also sheds rain better.

What I claim is:

1. A rumble seat top for attachment between the usual top of an automobile and the back of the rumble seat thereof, comprising a pair of crossed frame members pivotally secured together at their points of crossing, outwardly extending slots in the forward ends of said members adapted to engage with pin members secured to the usual top of the automobile, a rear cross member removably attached to the aforementioned frame members adjacent their rear ends, and means for supporting said last mentioned member from the top of a rumble seat.

2. A rumble seat top as described in claim 1 in which said frame members are provided with pivoted extensions adapted to swing outwardly with respect to said members, and means for preventing said extensions from swinging inwardly.

3. A top for the rumble seat of an automobile comprising a frame and a cover supported by said frame, means for supporting the front end of said frame with respect to the automobile, a rear support for said frame comprising a substantially vertical member extending down from said frame, a cross member attached to the lower end of said vertical member, said cross member having a portion bent down and rearwardly whereby it fits over a lip on the edge of a rumble seat, and means for clamping the lip of said rumble seat against said member.

4. A top for the rumble seat of an automobile comprising a frame work including two crossed members, a pair of additional members hingedly connected together at their inner ends and extending outwardly to the edge of said top, and means for securing each of said last members to one of said crossed members at any one of a plurality of points along said members.

5. A rumble seat top comprising a frame having members attachable at their forward end to the usual top of an automobile, a top cover supported on said frame members, a rear cross member for supporting said first-mentioned frame members, a downwardly extending member attached to said cross member, and serving as the sole supporting means for the rear end of the top, a rear curtain separate from said top cover and attached at its top to said cross member, a bar extending along the lower edge of said rear curtain and attached thereto, and means for removably attaching said bar to said downwardly projecting member allowing rear curtain to be completely detached without disturbing the covering overhead.

6. A rumble seat top for attachment to the usual top of an automobile with rumble seat and reaching to the rumble seat back and fastening thereto, comprising a pair of crossed frame members pivoted together at their point of crossing, means secured to the usual top of the automobile for engaging with the forward ends of said frame members when the latter are forced apart, the forward ends of said frame members being directed outwardly to engage said means, and a cross member having its outer ends engageable with the rear ends of said frame members, said cross member serving to maintain the ends of said first members rigidly in separated position for supporting a top covering and at the same time maintaining the forward ends of said members in their outward position in which they are in engagement with said means secured to the usual top of the automobile.

CLINTON C. BUTEFISH.